US008675525B2

(12) United States Patent
Lee et al.

(10) Patent No.: US 8,675,525 B2
(45) Date of Patent: Mar. 18, 2014

(54) MEDIA CONFERENCE RECORDING BASED ON TERMINATION EVENTS

(75) Inventors: Kang Lee, San Jose, CA (US); Shmuel Shafer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 811 days.

(21) Appl. No.: 12/580,669

(22) Filed: Oct. 16, 2009

(65) Prior Publication Data
US 2011/0090822 A1    Apr. 21, 2011

(51) Int. Cl.
*H04L 12/16* (2006.01)
*H04Q 11/00* (2006.01)

(52) U.S. Cl.
USPC ............ 370/262; 370/259; 370/260; 370/261

(58) Field of Classification Search
None
See application file for complete search history.

(56) References Cited

U.S. PATENT DOCUMENTS

| 5,572,728 | A | 11/1996 | Tada et al. |
| 6,608,636 | B1 | 8/2003 | Roseman |
| 6,611,583 | B1 | 8/2003 | Gainsboro |
| 6,785,370 | B2 | 8/2004 | Glowny et al. |
| 6,937,706 | B2 | 8/2005 | Bscheider et al. |
| 2002/0101446 | A1* | 8/2002 | Tang et al. ...................... 345/751 |
| 2003/0022671 | A1 | 1/2003 | Huomo et al. |
| 2004/0203677 | A1 | 10/2004 | Brown et al. |
| 2005/0233736 | A1 | 10/2005 | Berstis et al. |
| 2005/0243714 | A1* | 11/2005 | Moon ............................ 370/216 |
| 2006/0031290 | A1* | 2/2006 | Mannaru et al. .............. 709/204 |
| 2006/0126806 | A1* | 6/2006 | Trandal et al. .............. 379/88.26 |
| 2007/0263603 | A1* | 11/2007 | Schmitt ......................... 370/356 |
| 2008/0247528 | A1* | 10/2008 | Charish ..................... 379/202.01 |
| 2010/0052930 | A1* | 3/2010 | Grigsby et al. ............... 340/663 |
| 2010/0316207 | A1* | 12/2010 | Brunson .................. 379/202.01 |
| 2013/0028398 | A1* | 1/2013 | Mikan et al. ................. 379/67.1 |

OTHER PUBLICATIONS

International Search Report dated Feb. 1, 2011 for PCT/US2010/052229.
Office Action issued Nov. 25, 2013 for Chinese Application No. 201080046523.X.

* cited by examiner

*Primary Examiner* — Jae Y Lee
(74) *Attorney, Agent, or Firm* — Brinks Gilson & Lione

(57) ABSTRACT

A media conference device is provided. The media conference device includes a processor and a memory coupled with the processor. The memory stores instructions that are executable by the processor. The instructions are executable to detect a termination event and transmit a termination event message that indicates that the termination event was detected and requests that a media conference be recorded.

22 Claims, 7 Drawing Sheets

MEDIA CONFERENCE RECORDING BASED ON TERMINATION EVENTS

FIELD

The present embodiments relate to media conferencing between conference participants. In particular, the present embodiments may relate to recording (i.e., taping, storing, preserving, or filing) a media conference when a termination event is detected.

BACKGROUND

Conference participants may join a media conference. However, in the event that a termination event occurs during the middle of the media conference, one or more of the conference participants may be dropped out of the media conference. As a result, the dropped conference participants may be unable to finish participating in the media conference.

DETAILED DESCRIPTION

The present embodiments relate to media conferencing between conference participants. In particular, the present embodiments relate to recording (i.e., taping, storing, preserving, or filing) a media conference when a termination event is detected. Termination events are events that prevent a conference participant from participating in the media conference. Exemplary termination events include power source events, lost reception events, quality of service deterioration events, or participation events. The conference is recorded when a participant is undesirably dropped from the conference, allowing others to continue and the dropped participant to have access to recorded communications during the remainder or missed portion of the conference.

In one aspect, a media conference device used to participate in a media conference may include a processor and a memory coupled with the processor. The memory may store instructions that are executable by the processor. The instructions may be executable to join a media conference and detect a termination event and transmit a termination event message. The termination event message may indicate that the termination event was detected and initiate a recording of a media conference. The termination event may be an event that prevents or is likely to prevent a conference participant from participating in the media conference.

In a second aspect, a method for recording a media conference is provided. The method includes detecting a termination event, the termination event being an event that prevents a conference participant from participating in a media conference; and transmitting a termination event message that indicates that the termination event was detected and initiating a recording of the media conference.

In a third aspect, a method for recording a media conference is provided. The method includes detecting a termination event, the termination event message indicating that the termination event was detected and the conference participant, and initiating the recording of the media conference based on the termination event. The method may further include recording the media conference and transmitting a recorded conference message to the conference participant, the recorded conference message including recorded media conference data.

Figure 1:
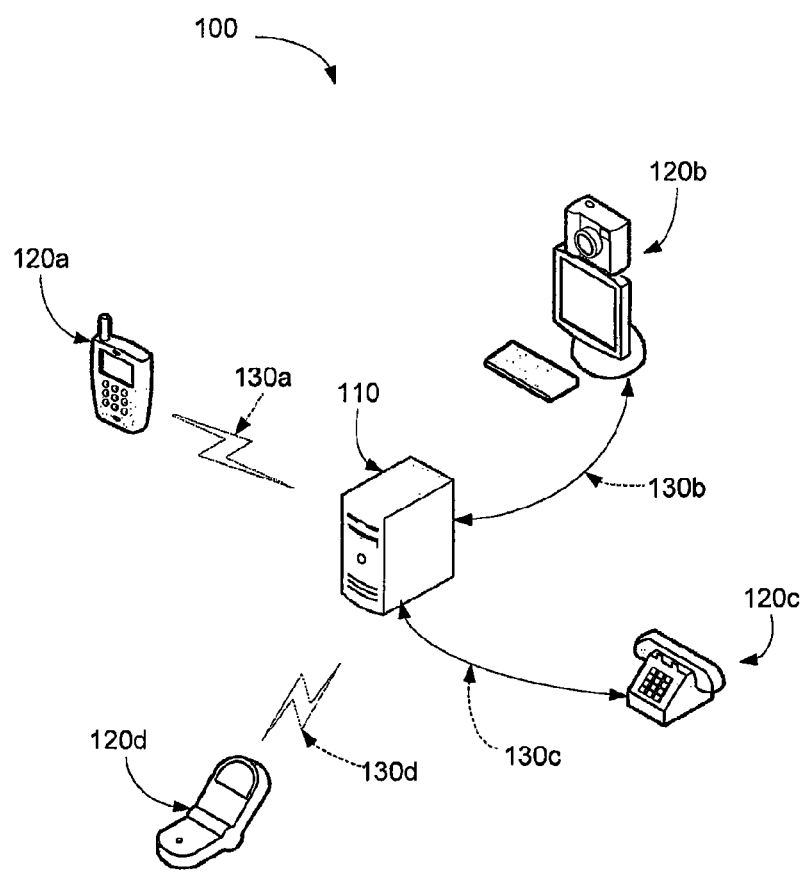
FIG. 1 illustrates one embodiment of a conference network.

FIG. 1 illustrates a media conference network 100. The media conference network 100 may include one or more conference servers (hereinafter, conference server) 110 and one or more participant communication devices 120. The conference server 110 may be coupled with the one or more participant communication devices 120 via communication network 130. As used herein, "coupled with" may include directly connected to or indirectly connected through one or more intermediary components. Intermediary components may include hardware components and/or software components. In an alternative embodiments, the network 100 may include additional, different, or fewer components.

The media conference network 100 may be used to establish and maintain a media conference. "Media" may include audio, video, graphical, textual, or a combination thereof. "Conference" may include a meeting or discussion or act of conferring or consulting together between conference participants using participant communication devices 120. For example, in one embodiment, the media conference may be a conference call. The conference participants may be using telephones. In another embodiment, the media conference may be a videoconference having both video and audio. In yet another embodiment, the media conference may be an instant message session or textual exchange. The media conference may be a mixed media conference. For example, some conference participants may join with voice and video capabilities and other may join only with voice or text capabilities. The capabilities depend on the type of participant communication device 120 that is being used.

One or more conference participants may join the media conference. The conference participants may use participant communication devices 120a, 120b, 120c, and 120d to join the media conference, for example, by dialing in to the media conference or joining via an Internet link. The conference participants may join the media conference in any order or in a specified order. A media conference may have three or more participants at some point instead of a mere two-way exchange. The number of participants may change throughout the media conference.

A termination event may be identified, for example, by the conference server 110, participant communication device 120, or other managing server. The termination event may be identified prior to or during the media conference. A termination event may be an event that prevents a participant from participating in the media conference. The termination event may be used to initiate the recording (i.e., taping, storing, preserving, or filing) of the media conference. Alternatively, in the event that the media conference is already being recorded, the termination event may be used to identify one or more portions of the media conference that were missed by a conference participant. All, some, or none of the media conference recording may be provided to the conference participant, for example, via the participant communication device 120. For example, the actual recording may be provided or a link to the actual recording may be provided.

In one illustration, a participant, using participant communication device communication device 120d, which may be a cellular telephone, may lose cellular reception during the media conference. The loss of reception may be a termination event. Upon detection of the termination event, the conference server 110 may begin recording the media conference. The recording may be transmitted to the participant using the cellular telephone, for example, after the media conference is completed.

The conference server 110 may include a communication server, file server, email server, e-commerce server, database server, proxy server, real-time communication server, content server, streaming media server, Web server, management server, directory server, mobile information server, application server, or other server operable to support a conference. Additional, different, or fewer components may be provided.

The participant communication device 120 may be a media conference device, communication device, cellular telephone, telephone, videophone, smartphone, personal digital assistant, personal computer, server, endpoint, or other device for communicating with the conference server 110. The participant communication device 120 may be used, managed, owned, or controlled by a participant (i.e., user). The participant may be a human being or electronic device programmed to participate in a media conference. The participant communication device 120 may be operable to communicate with the conference server 110. For example, in one embodiment, the participant communication device 120 may connect to the media conference supported by the conference server 110. Additional, different, or fewer components may be provided. For example, the participant communication device 120 may include a camera, input device, and/or display.

The conference server 110 and/or participant communication device 120 may include one or more processors and memory. The processors may be general processors, digital signal processors, application specific integrated circuits, field programmable gate arrays, analog circuits, digital circuits, combinations thereof, or other now known or later developed processors. The processor may be a single device or a combination of devices, such as associated with a network or distributed processing. Any of various processing strategies may be used, such as multi-processing, multi-tasking, parallel processing, remote processing, or the like. The processor is responsive to instructions stored as part of software, hardware, integrated circuits, firmware, micro-code or the like. For example, the processors may be operable to execute instructions stored on the memory.

The memory may be a computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory may be a single device or a combination of devices. The memory may be adjacent to, part of, networked with and/or remote from the processor.

Data representing instructions, executable by the processors, may be stored in the computer readable storage media. Logic encoded or embedded in one or more tangible media for execution is defined as the instructions that are executable by the programmed processor and that are provided on the computer-readable storage media, memories, or a combination thereof. The one or more processors may be programmed with and execute the instructions. The functions, acts, methods or tasks illustrated in the figures or described herein may be performed by the programmed processor executing the instructions stored in the memory. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The communication network 130 may include a public switched telephone network (PSTN), the Internet, local area network (LAN), wide area network (WAN), wired network, wireless network, cellular network, a combination thereof, or any other network suitable for carrying media. The communication network 130 may include one or more intermediary components, such as gateways, routers, switches, hubs, private branch exchange, Web conferencing application, conference call application, text chat server, networks, videoconferencing application or other component.

Figure 2:
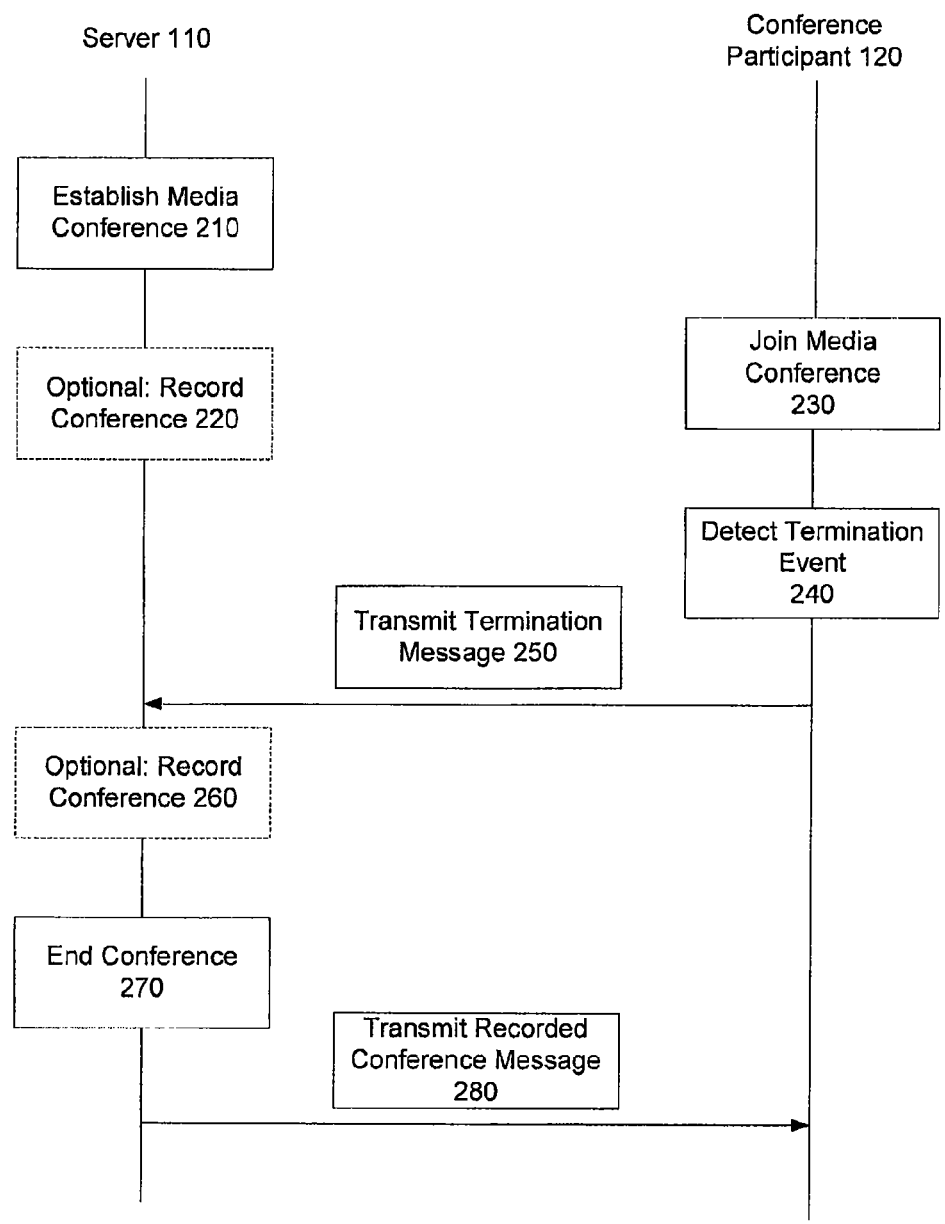
FIG. 2 illustrates one embodiment of communication between a server and communication device.

FIG. 2 illustrates one embodiment of the interaction between a conference server 110 and a participant communication device 120. As shown in block 210, the conference server 110 may establish a media conference. As shown in block 220, the conference server 110 may optionally begin recording the media conference immediately after establishing the media conference. Accordingly, the entire media conference may be recorded.

One or more conference participants 120 may join the media conference, as shown in block 230. Joining the media conference may include dialing into the media conference, connecting to a media conference session, or otherwise joining a media conference with zero, one, or more additional conference participants 120. For example, the first participant to join the conference may join the conference without other participants. The second participant may join the first participant.

As shown in block 240, a participant communication device 120 or server 110 may detect a termination event. Termination events may be events that prevent a participant from participating in a media conference. Termination events may be intentional or unintentional. An intentional termination event may include hanging up a telephone during a media conference. An unintentional termination event may include losing reception while driving. Exemplary termination events include power source events, lost reception events, quality of service deterioration events, and participation events. Other termination events may be used.

Figure 3:
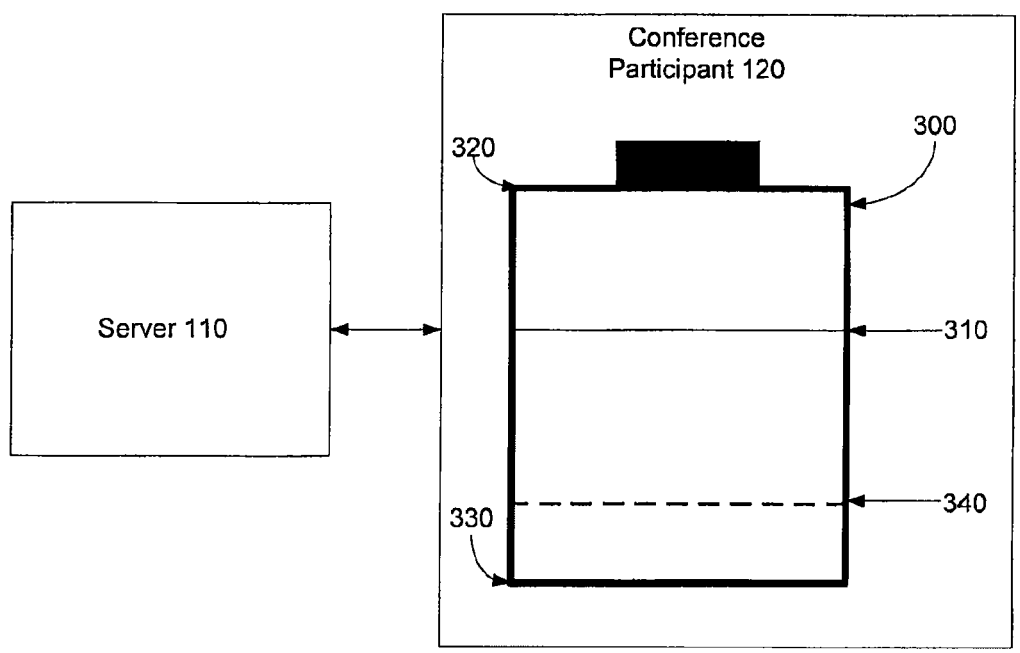
FIG. 3. illustrates one embodiment of a power source event.

FIG. 3 illustrates one embodiment of a termination event. The termination event is a power source event. The power source 300 indicates the current power level 310 of the participant communication device 120 relative to a fully charged level 320 (e.g., 100% charged) and a fully drained level 330 (e.g., 0% charged). A termination event may occur when the current power level 310 reaches the fully drained level 330. Alternatively, or additionally, a termination event may occur when the current power level 310 reaches a power level threshold 340 (e.g., 20% charged). The power level threshold 340 may be predetermined and set at any of one or more levels. For example, the power level threshold 340 may be set at 0%, 100%, any level between 0% and 100%, or a combination thereof. The power level threshold 340 may be set at a level that indicates that the current power level 310 is nearing the fully drained level 330. Alternatively, or additionally, the power level threshold 340 may be set at a level that indicates that the current power source has been completely drained of power. In other words, the participant communication device 120 is without power and unable to continue the media conference.

Figure 4:
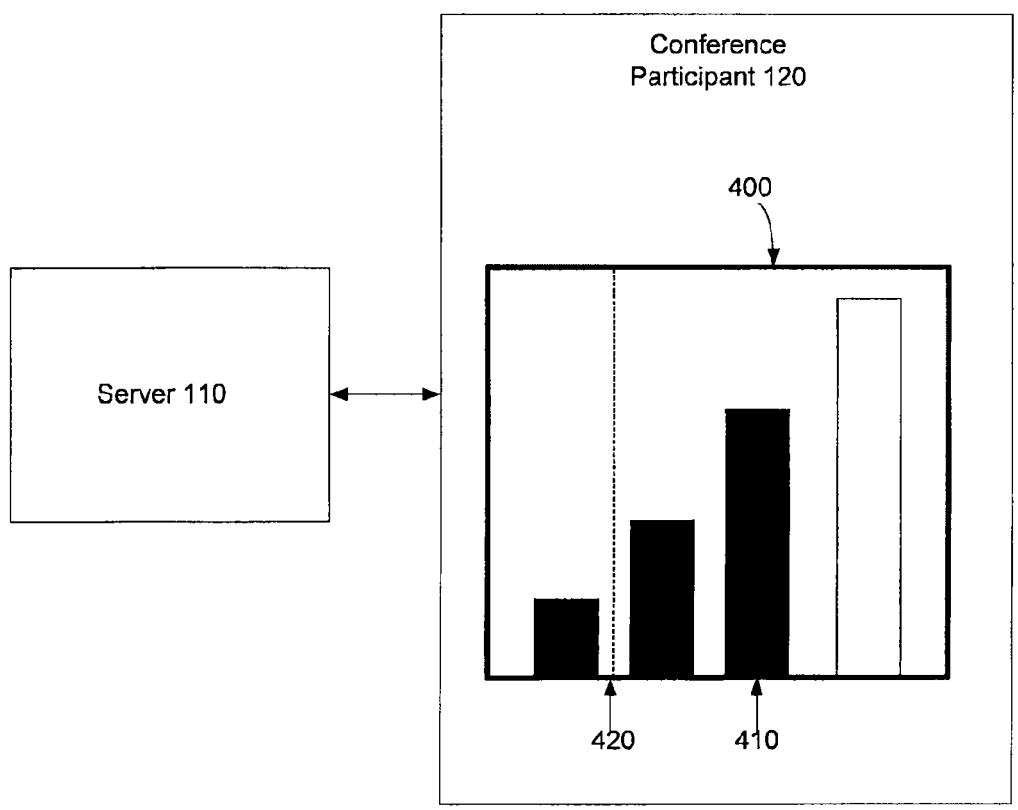
FIG. 4. illustrates one embodiment of a cellular reception event.

FIG. 4 illustrates another embodiment of a termination event. The termination event is a cellular reception event. The cellular reception event may indicate when cellular reception is reduced to a level that does or is likely to cause disconnect between the participant communication device 120 and conference server 110. In other words, the cellular reception event may take place when a dropped call is about to take place or does take place. The reception bars 400 indicate the current cellular reception level 410 of the participant communication device 120. The reception bars indicate cellular reception for the participant communication device 120. A cellular reception event occurs when the current cellular reception level 410 deteriorates to (e.g., matches) a cellular reception threshold 420. The cellular reception threshold 420 may be predetermined and set at any of one or more levels. For example, the cellular reception threshold 420 may be set at 0%, 100%, any level between 0% and 100%, or a combination thereof. The cellular reception threshold 420 may be set at a level that indicates that the current cellular reception level 410 is nearing a dropped call level, for example, the 0% level. Alternatively, or additionally, the cellular reception threshold 420 may be set at a level that indicates that the participant communication device 120 has lost reception. In other words, the participant communication device 120 has been disconnected from the media conference because of poor reception. Poor reception, such as associated with data loss, may be used as a termination event.

In an alternative embodiment, the conference server 110 or other device may identify a termination event, such as a cellular reception event. The termination event may be identified, for example, by monitoring power source, reception, quality of service, or participation. A gateway connecting the participant communication device 120 to a cellular network or the conference server 110 may detect a cellular reception event, for example, by directly or indirectly monitoring cellular reception. This may be beneficial because without reception, the participant communication device 120 may be unable to properly transmit and receive messages, which indicate that a termination event was identified. The termination event may be that the participant is no longer participating in the media conference.

Figure 5:
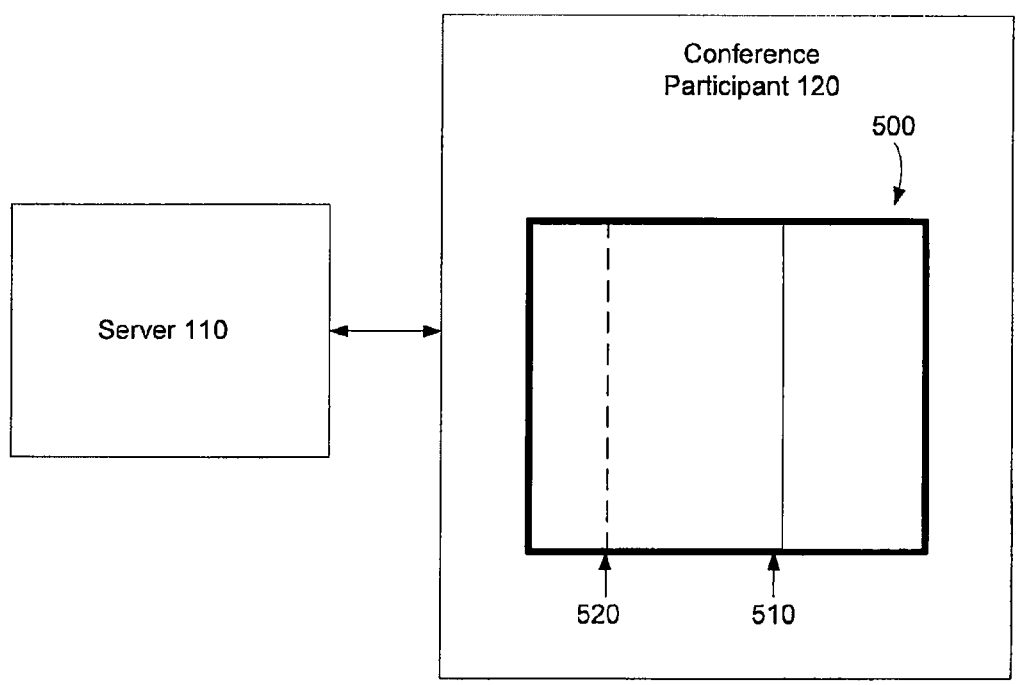
FIG. 5. illustrates one embodiment of a quality of service event.

FIG. 5 illustrates yet another embodiment of a termination event. The termination event is a quality of service event. The quality of service 500 indicates the quality of service of the network 130 connection between the participant communication device 120 and the conference server 110. Quality of service may relate to bandwidth, VoIP quality, network route performance, audio performance, and/or video quality. A quality of service event may occur when a current quality level 510 deteriorates to (e.g., matches) a quality of service guarantee 520. For example, the quality of service guarantee 520 may be set at 0%, 100%, any level between 0% and 100%, or a combination thereof. The quality of service guarantee 520 may be set at a level that indicates that the current quality of service level 510 is nearing a dropped, spotty, or hard-to-use level, for example, the 0% level. Alternatively, or additionally, the quality of service guarantee 520 may be set at a level that indicates that the participant communication device 120 has a poor connection, is about to be disconnected, or has been disconnected. In one exemplary embodiment, the system 100 may employ ITU P.VTQ or P.563 real-time voice quality (VQ) algorithms to assess the voice quality and the quality of service provided by the overall system.

In the field of computer networking and other packet-switched telecommunication networks, a quality of service guarantee 520 may be used to guarantee a certain level of performance to a data flow. For example, a required bit rate, delay, jitter, packet dropping probability and/or bit error rate may be guaranteed. Quality of service guarantees are important if the network capacity is insufficient, especially for real-time streaming multimedia applications, such as VoIP calls or video over IP communication, since these often require fixed bit rate and are delay sensitive. QoS guarantee may be agreed on in a traffic contract for the application software and reserve capacity in the network nodes, for example, during a session establishment phase or setup phase. During the VoIP phone call, one or more call monitoring systems may monitor the achieved level of performance, for example, the data rate and delay, and dynamically identify a termination event.

Figure 6:
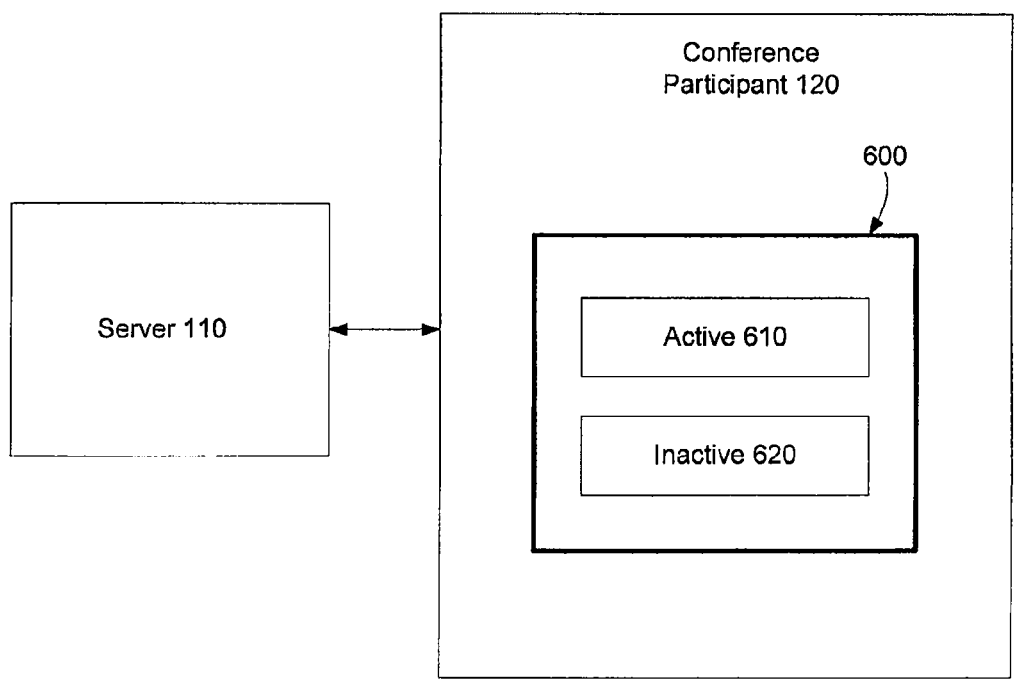
FIG. 6. Illustrates one embodiment of a participation event.

FIG. 6 illustrates yet another embodiment of a termination event. In this embodiment, the termination event is a participation event. The participation 600 may indicate the participation of a user of the conference participant. The participation 600 may be active 610 or inactive 620. A participation event may occur when the participation 600 changes to active 610 or inactive 620. For example, in one embodiment, the participation 600 may change to inactive 620 when a participant communication device 120 places the media conference on hold. The participant communication device 120 may receive another phone call during the media conference, place the media conference on hold, and answer the other phone call. In another embodiment, the participation 600 may change to inactive 620 when the participant is not focusing on the media conference. Video camera analytics may be used to determine when the participant is focusing on the media conference or is distracted with other events. For example, the participation 600 may change to inactive when someone walks into the room and begins speaking with the user of the participant communication device 120. In yet another embodiment, the participation 600 may change to inactive 620 when the participant communication device 120 disconnects from the media conference.

In another embodiment, a participation event may occur when the participation 600 reaches a certain participation threshold level may be used. The participation threshold level may be set at 0%, 100%, any level between 0% and 100%, or a combination thereof. The participant communication device 120 may determine the participation level, for example, by analyzing how many other tasks that the user is performing during the media conference and assigning a participation level.

In yet another embodiment, a participation event may occur when there is a scheduling conflict. For example, a media conference may be scheduled from 1:00-2:00 pm and the participant may have a calendar event from 1:30-2:30 pm. A participation event may occur at 1:30 pm. In other words, a participation event may occur when there is scheduling overlap between the media conference and another calendar event.

Referring back to FIG. 2, although shown that the participant communication device 120 detects the termination event, in alternative embodiments, the conference server 110 may identify the termination event. For example, in one embodiment, the conference server 110 may detect when the participant communication device 120 becomes disconnected from the media conference. The disconnection of the participant communication device 120 may be a termination event. The conference server 110 may use the power level, reception level, quality of service level, and participation level to identify a termination event. The conference server 110 may termination event information, such as a power level, reception level, quality of service level, and participation level, from the participant communication device 120 or from a server or device supporting or monitoring the participant communication device 120. For example, the conference server 110 may receive a reception level from a cellular server supporting the participant communication device 120. In another example, the conference server 110 may receive a quality of service level from a monitoring server, which monitors the quality of service between the conference server 110 and participant communication device 120.

Upon detecting a termination event, the participant communication device 120 may transmit a termination message to the conference server 110, as shown in block 250. The termination message may indicate that participant communication device 120 was disconnected or may be disconnected from the media conference. The termination message may include a timestamp and conference participant identification. The timestamp may indicate the time that the termination event was identified. The conference participant identification may identify the conference participant.

In the event that the conference server 110 is recording the media conference, the conference server 110 may continue recording the media conference. However, as shown in block 260, in the event that the conference server 110 is not recording the media conference, the conference server 110 may begin recording the media conference upon receiving the termination message 250.

Although FIG. 2 illustrates that the termination event is reported by the participant communication device 120, in alternative embodiments, the server 110 may receive the termination message from other components attached to network 130.

After the media conference has completed, as shown in block 270, the conference server 110 may transmit a recorded conference message 280 to the participant communication device 120. The recorded conference message may include recorded media conference data. In one embodiment, the recorded media conference data includes a link to all or some of the recorded media conference. In another embodiment, the recorded media conference data includes all or some of the recorded media conference. For example, when the termination event message includes a timestamp, the recorded media conference data may include the recorded media conference beginning from the timestamp. As a result, the media conference may be recorded beginning at a time that is near the time that the termination event occurred. In another embodiment, the timestamp and the associated ID of the person who dropped out of the conference at the said time is included as metadata associated with the media stream.

The user of the communication device 120 may use the recorded conference message 280 to play the recorded media conference. In one embodiment, the user or participant may utilize the metadata to identify the beginning of the conference recording associated with the time she dropped out of the said conference. For example, the user may identify that a termination event occurred at minute 3 into the media conference.

In an alternative embodiment, the participant communication device 120 may rejoin the media conference after the termination event. Upon rejoining the media conference, the participant communication device 120 may transmit a rejoin message to the conference server 110 or the server 110 may detect the rejoining. The rejoin message may include a timestamp and conference participant identification. The conference server 110 may use the timestamp and conference participant identification to provide a conference recording to the participant communication device 120 that is defined by the time that was missed by the participant communication device 120. For example, the conference server 110 may stop recording the media conference upon receiving the rejoin message. Alternatively, or additionally, the conference server 110 may provide only the portion of the media conference recording between the timestamp in the termination event message and the timestamp in the rejoin message.

Figure 7:
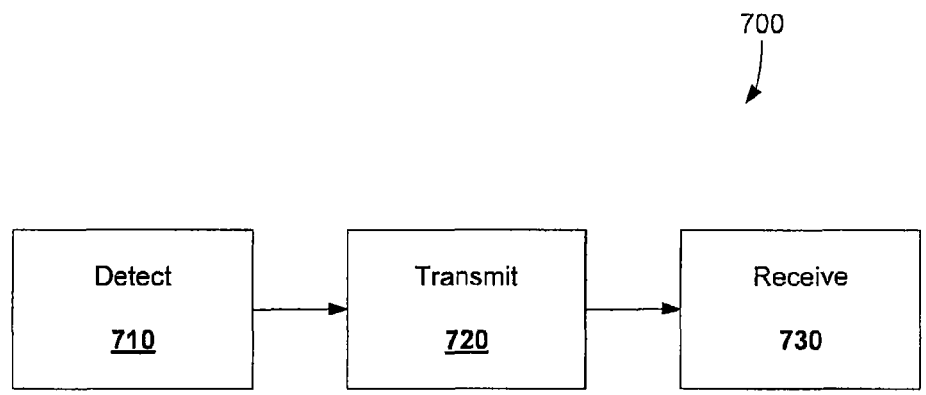
FIG. 7 illustrates one embodiment of a method for recording a media conference.

FIG. 7 illustrates one embodiment of a method 700 for recording a media conference. The method 700 includes detecting a termination event 710, transmitting a termination event message that indicates that the termination event was detected and requests that a media conference be recorded 720, and receiving a recorded conference message in response to the termination event message 730. The acts may be performed in the order shown or a different order. The method 700 may include additional, different, or fewer acts. For example, the method 700 may include acts 710 and 720.

In act 710, a conference system, such as a conference server or conference participant, may detect a termination event. In one embodiment, detecting a termination event may include comparing a current power level to a power threshold level to determine when the power source event has occurred. In another embodiment, detecting a termination event may include comparing a current cellular reception level to a cellular reception threshold level to determine when the cellular reception event has occurred. In yet another embodiment, detecting a termination event may include comparing a current quality of service level to a quality of service guarantee to determine when the quality of service event has occurred. In yet another embodiment, detecting a termination event may include determining when participation changes from active to inactive to determine when a participation event has occurred. In an alternative embodiment, a cellular network may be used to notify the conference bridge that a specific caller dropped out of the conference because of lose of cellular coverage in the area from which he connected to the conference.

In act 720, the participant communication device may transmit a termination event message. The termination event message may include a time stamp and/or conference participant identification. The time stamp may be used to ensure that the correct portion of the media conference is transmitted to the conference participant. The conference participant identification may be used to ensure that the participant receives the correct portion of the media conference.

In act 730, the participant may receive a recorded conference message in response to the termination event message. The recorded conference message may include recorded media conference data. In one embodiment, the recorded media conference data includes a link to all or some of the recorded media conference. In another embodiment, the recorded media conference data includes all or some of the recorded media conference. For example, when the termination event message includes a timestamp, the recorded media conference data may include the recorded media conference beginning from the timestamp, beginning shortly after the timestamp, or beginning a programmable amount of time before the timestamp. As a result, the media conference may be recorded beginning at a time that is near the time that the termination event occurred.

Figure 8:
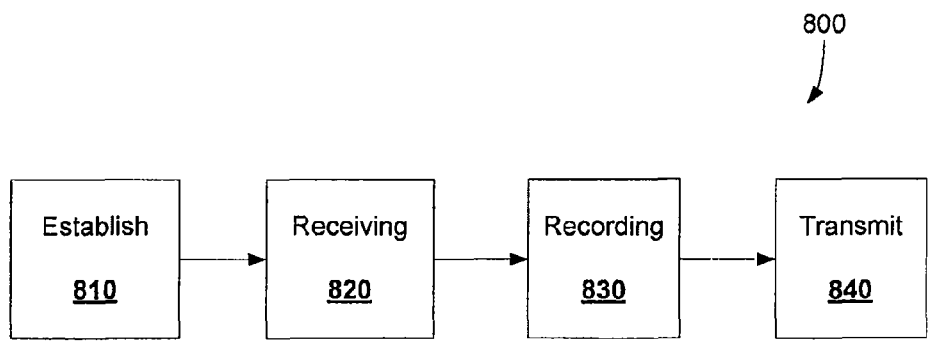
FIG. 8 illustrates another embodiment of a method for recording a media conference.

FIG. 8 illustrates one embodiment of a method 800 for recording a media conference. The method 800 includes establishing a media conference for conference participants 810; receiving a termination event message from a conference participant 820; recording a media conference 830; and transmitting a recorded conference message to the participant communication device 840. The acts may be performed in the order shown or a different order. The method 800 may include additional, different, or fewer acts. For example, the method 800 may include only acts 810, 820, and 830.

In act 810, a conference server may establish a media conference. Conference participants may join the media conference. In act 820, the conference server may receive a termination event message from a conference participant. The termination event message may indicate that a termination event was detected. The termination event message may include a timestamp and conference participant identification. In act 830, the conference server may record the media conference. The conference server may record all or some of the media conference. Recording may take place prior to reception of the termination event message or after reception. Recording may be triggered by the termination event message. For example, the conference server may begin recording the media conference upon receiving the termination event message. In act 840, the conference server may transmit a recorded conference message to the conference participant. The recorded conference message including recorded media conference data. In one embodiment, recorded media conference data includes a link to all or some of the recorded media conference. In another embodiment, recorded media conference data includes all or some of the recorded media conference. For example, when the termination event message includes a timestamp, the recorded media conference data may include the recorded media conference beginning from the timestamp.

Various embodiments described herein can be used alone or in combination with one another. The foregoing detailed description has described only a few of the many possible implementations of the present invention. For this reason, this detailed description is intended by way of illustration, and not by way of limitation.

The invention claimed is:

1. A media conference device used to participate in a media conference, the media conference device comprising:
   a processor; and
   a memory coupled with the processor, the memory storing instructions that are executable by the processor, the instructions being executable to:
      join the media conference;
      detect a termination event;
      in response to detection of the termination event, transmit a termination event message to initiate a recording of the media conference, the termination event message comprising a first timestamp indicating a start time of a time period of the media conference missed by the media conference device;
      determine to rejoin the media conference after transmission of the termination event; and
      in response to the determination to rejoin, transmit a rejoin message to stop the recording of the media, the rejoin message comprising a second timestamp indicating a stop time of the time period of the media conference missed by the media conference device.

2. The media conference device as claimed in claim 1, wherein the termination event includes a power source event and the instructions are executable to compare a current power level to a power threshold level to determine when the power source event has occurred.

3. The media conference device as claimed in claim 1, wherein the termination event includes a cellular reception event and the instructions are executable to compare a current cellular reception level to a cellular reception threshold level to determine when the cellular reception event has occurred.

4. The media conference device as claimed in claim 1, wherein the termination event includes a quality of service event and the instructions are executable to compare a current quality of service level to a quality of service guarantee to determine when the quality of service event has occurred.

5. The media conference device as claimed in claim 1, wherein the instructions are executable to determine when the participation changes from active to inactive.

6. The media conference device as claimed in claim 1, wherein the instructions are executable to receive a recorded conference message in response to the termination event message.

7. The media conference device as claimed in claim 1, wherein the termination event comprises an event indicative of an inability of the media conference device to receive media generated from the media conference.

8. The media conference device as claimed in claim 1, wherein the instructions are executable to receive the recording of the media from the start time to the stop time.

9. A method for recording a media conference, the method comprising:
   detecting, with a media conference device, a termination event;
   in response to detecting the termination event, transmitting, with the media conference device, a termination event message to initiate a recording of the media conference, the termination event message comprising a first timestamp indicating a start time of a time period of the media conference missed by the media conference device;
   determining, with the media conference device, to rejoin the media conference after transmitting the termination event; and
   in response to determining to rejoin, transmitting, with the media conference device, a rejoin message to stop the recording of the media, the rejoin message comprising a second timestamp indicating a stop time of the time period of the media conference missed by the media conference device.

10. The method as claimed in claim 9, further comprising receiving a recorded conference message in response to the termination event message, the recorded conference message including a recording of the conference beginning at a time that is near the time that the termination event occurred.

11. The method of claim 9, wherein the termination event occurs when a current operating characteristic of the media conference device reaches a threshold level.

12. The method as claimed in claim 11, wherein the termination event comprises a power source event, the current operating characteristic comprises a current power level of the media conference device and the threshold level comprises a power threshold level, the method further comprising comparing the current power level to the power threshold level to determine whether the power source event has occurred.

13. The method as claimed in claim 11, wherein the termination event comprises a cellular reception event, the current operating characteristic comprises a current cellular reception level, and the threshold level comprises a cellular reception threshold level, the method further comprising comparing the current cellular reception level to the cellular reception threshold level to determine whether the cellular reception event has occurred.

14. The method as claimed in claim 11, wherein the termination event comprises a quality of service event, the current operating characteristic comprises a current quality of service level, and the threshold level comprises a quality of service guarantee, the method further comprising comparing the current quality of service level to the quality of service guarantee to determine whether the quality of service event has occurred.

15. A method for recording a media conference, the method comprising:
   detecting, with a conference server, a termination event;
   in response to detecting the termination event, initiating, with the conference server, recording of a media conference at a start time of a time period of a media conference missed by the media conference device;
   receiving, with the conference server, a rejoin message from the media conference device, the rejoin message comprising a timestamp that indicates a stop time of the time period of the media conference missed by the media conference device;
   in response to receiving the rejoin message, stopping, with the conference server, the recording of the media conference at the stop time indicated by the timestamp; and
   transmitting, with the conference server, the recording of the media conference from the start time to the stop time to the media conference device.

16. The method as claimed in claim 15, further comprising: receiving a termination event message to detect the termination event.

17. The method as claimed in claim 15, further comprising establishing a media conference for conference participants.

18. The method as claimed in claim 15, further comprising transmitting a recorded conference message to the conference participant, the recorded conference message including recorded media conference data that includes a link to all or some of the recorded media conference.

19. The method as claimed in claim 15, further comprising transmitting a recorded conference message to the conference participant, the recorded conference message including recorded media conference data that includes all or some of the recorded media conference.

20. The method as claimed in claim 15, further comprising, in response to detecting the termination event, receiving a termination event message used to detect the termination event, the termination event message including a timestamp and conference participant identification, the timestamp indicating a stop time of a time period of the media conference missed by the media conference device.

21. One or more non-transitory tangible media comprising logic, the logic being executable by a processor and operable to:
   join the media conference;
   detect a termination event, the termination event being an event indicative of an inability of a media conference device that is a member of the media conference to receive media generated from the media conference; and
   in response to detection of the termination event, transmit a termination event message to initiate a recording of the media conference, the termination event message comprising a first timestamp indicating a start time of a time period of the media conference missed by the media conference device;
   determine to rejoin the media conference after transmission of the termination event; and
   in response to the determination to rejoin, transmit a rejoin message to stop the recording of the media, the rejoin message comprising a second timestamp indicating a stop time of the time period of the media conference missed by the media conference device.

22. The one or more non-transitory tangible media as claimed in claim 21, wherein the logic being executable by the processor is further operable to receive the recording of the media from the start time to the stop time.

* * * * *